(12) United States Patent
Alimpich et al.

(10) Patent No.: US 6,344,859 B1
(45) Date of Patent: *Feb. 5, 2002

(54) DATA PROCESSOR CONTROLLED DISPLAY SYSTEM WITH A PLURALITY OF SELECTABLE BASIC FUNCTION INTERFACES FOR THE CONTROL OF VARYING TYPES OF CUSTOMER REQUIREMENTS AND WITH ADDITIONAL CUSTOMIZED FUNCTIONS

(75) Inventors: Claudia Alimpich; Benjamin Nelson Jeffcoat, both of Boulder; Deborah Elizabeth Neuhard; Luana Linda Vigil, both of Longmont; James Philip John Wittig, Boulder, all of CO (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,210

(22) Filed: Mar. 31, 1998

(51) Int. Cl.$^7$ ................................................ G06F 13/00
(52) U.S. Cl. ...................................... 345/762; 345/841
(58) Field of Search ................................. 345/333, 965, 345/966, 353, 762, 841; 395/114, 115, 116; 358/1.15, 1.16, 1.17

(56) References Cited

U.S. PATENT DOCUMENTS

| | | | | |
|---|---|---|---|---|
| 5,061,958 A | * | 10/1991 | Bunker et al. | 345/333 |
| 5,566,278 A | * | 10/1996 | Patel et al. | 395/114 |
| 5,657,461 A | * | 8/1997 | Harkins et al. | 345/335 |
| 5,774,118 A | * | 6/1998 | Hatakama | 345/337 |
| 5,774,120 A | * | 6/1998 | Goddard et al. | 345/348 |
| 5,872,569 A | * | 2/1999 | Salgado et al. | 345/349 |

* cited by examiner

Primary Examiner—Cao H. Nguyen
(74) Attorney, Agent, or Firm—David W. Victor; Konrad Raynes & Victor LLP (57) ABSTRACT

A data processing controlled display system for the interactive control of a variety of production operations is provided which offers to the operator a plurality of selectable sets of basic interactive functions, each set respectively for the control of one of a plurality of types of production operations. The operator interactively selects the one of said sets of basic functions most suitable for the control of the type of production operation which he wishes to control. There is further provided a plurality of selectable secondary functions for supplementing his selected set of basic functions for the production operation control and means for selecting at least one of said secondary functions so that the selected secondary function is combined with the selected set of basic functions into a customized interactive display interface for the control of the production operation.

22 Claims, 10 Drawing Sheets

DATA PROCESSOR CONTROLLED DISPLAY SYSTEM WITH A PLURALITY OF SELECTABLE BASIC FUNCTION INTERFACES FOR THE CONTROL OF VARYING TYPES OF CUSTOMER REQUIREMENTS AND WITH ADDITIONAL CUSTOMIZED FUNCTIONS

CROSS-REFERENCE TO RELATED COPENDING PATENT APPLICATIONS

The following patent applications which are assigned to the assignee of the present invention cover subject matter related to the subject matter of the present invention: "Data Processor Controlled Display System With a Plurality of Switchable Customized Basic Function Interfaces for the Control of Varying Types of Operations", U.S. Pat. No. 6,232,968; "Data Processor Controlled Display System for the Control of Operations With Control Properties Which are Selectably Constant or Variable", U.S. Pat. No. 6,181,340; "Data Processor Controlled Display Interface With Tree Hierarchy of Elements View Expandable into Multiple Detailed Views", U.S. Pat. No. 6,151,020; "Data Processor Controlled Interface with Multiple Tree of Elements Views Expandable into Individual Detail Views", U.S. Ser. No. 09/052,858; "Data Processor Controlled Display With a Tree of Items With Modification of Child Item Properties Designated at Parent Level Without Modification of Parent Item Properties", U.S. Pat. No. 6,115,020; and "Data Processor Controlled Display System With a Tree Hierarchy of Elements View Having Virtual Nodes", U.S. Pat. No. 6,111,530; all are assigned to International Business Machines Corporation by Claudia Alimpich et al. and all are filed concurrently herewith.

TECHNICAL FIELD

The present invention relates to interactive computer controlled display systems for controlling operations and particularly to user friendly display interfaces for the control of such operations.

BACKGROUND OF THE INVENTION

Application programs are used in all aspects of business, industry and personal/home endeavors. There is a large and diverse segment of consumers and workers that must interface with these applications. A vendor of an application program takes into consideration the typical skill level of a group of users for which the application is targeted in order to create the most "easy to use" interface to the application without sacrificing necessary functional features needed by the user to use the application.

Some vendors offer different versions of essentially the same application program, where the versions differ only in the user interface provided with the application program. This allows the vendor to target the same application program to various groups of users having different and varying skill levels. The varying skill levels may include computer skills or job specific skills for which the application was created.

For example, in production operations, including but not limited to the printing trades, the production of parts, tools and dies, integrated circuit manufacturing and processing and chemical industrial production; the operations typically involve repetitive functions performed over relatively long periods of time. Computerization of such operations takes advantage of the strengths of the computer for handling these functions functions effectively. Also, it can reduce the operator skill level required for many of the operations, and increase the productivity of all operators including those still needing high level skills to run and manage the operations.

Nevertheless, computerized production operations require user interfaces that accurately reflect the control requirements and options needed by an operator to run and manage the operations. As such, user interfaces can become more and more complex with hundreds of functional operations for all of the possible operating scenarios the operator may face. Typically, application vendors will design specific purpose software programs with specific display interfaces tailored to the specific production needs and/or the operator skill level. This approach may be viable in "pure" production operations where the runs are long term and of the same type of operations with few changes.

However, if every customer of the application vendor has different production control requirements, it may be too expensive and too inefficient for the vendor to provide an user interface tailored to each customer's specific production needs. Also, many production operations are not pure, i.e. the operations take on characteristics of other production environments.

For example, a "pure" commercial print shop operation may print manuals, books or other "print for profit" types of printing. A "pure" production print shop may be involved in printing large volumes of statements, invoices, bills, etc. for organizations. A "pure" network print environment may involve a multitude of low volume printing operations from individual workers in an office environment.

In specific, there is a need for an user interface for operators who manage print jobs and printers in each of these three different environments. Separate application programs, each with their own user interfaces, have been provided to customers in each of these different print operating environments since each environment theoretically has its own operating requirements. However, in the real world, these environments are not "pure", i.e. any one of these environments can have similarities to another environment. Typically, it is difficult for a software provider to categorize a given customer into some of these pure environments. In addition, some customers may want additional function other than what has been provided for their environment; or, if a customer has users with more novice skill levels, the customer may desire an user interface that limits the things that the users are allowed to do. Thus, providing an application program with just the "right" user interface for each and every customer has been a difficult problem for application program vendors to handle.

SUMMARY OF THE INVENTION

The present invention offers a solution to the above problems by providing a given application program with multiple selectable user interfaces or, rather, multiple selectable views of a same user interface where each view has a different set of interactive functions of the user interface. Each selectable view may be for a specific operating environment and/or for a specific skill level of a potential user. At the beginning of the application program, the user selects which view of the user interface the user wants. The application with the selected view is presented to the user in a separate window. In another embodiment, when the application is invoked, at least for the first time, separate windows of the application are presented to the user with each window having a different "default" view of the user interface. As such, multiple windows or views of the application can be displayed to the user with each window or view representing a different set of interactive functions of the user interface. In addition, the user can readily customize any of the views through the addition of added functions or by deleting default functions. For example, the user can select features from the other nonselected views of the user interface and incorporate them into the selected view. Various embodiments can be used in customizing a given selected interface such as by having a "customize" option button or by copying, cutting moving, dragging, dropping and/or pasting interactive functions of one view into a different view having a different set of default interactive functions. The user is able to have a customized user interface that accurately reflects the real "impure" operating environment; and the vendor only needs to make and distribute the same application program for each customer.

More specifically, the present invention relates to a data processor controlled display system for the interactive control of production operations comprising means for providing a plurality of selectable sets of basic interactive functions, each set respectively for the control of one of a plurality of types of production operations. Each of these function sets will provide a simple and basic interface which the program designer believes will provide all of the basic functions needed to control its corresponding production operation. Then, there are means for interactively selecting one of said sets of basic functions for the control of one type of production operation. There are further means for providing a plurality of selectable secondary functions such as would be applicable to at least one other type of production operation for supplementing said selected set of basic functions in said production operation control together with means for selecting at least one of said secondary functions. For example, the selected secondary functions may be chosen from another set of basic interactive functions. The selected at least one secondary function is combined with the selected set of basic functions into a customized interactive display interface for the control of said production operation. In addition, in customizing the interface, there are also means for optionally deleting at least one of said basic functions from said selected set of basic functions. It should be noted that all of the functions, whether in a set of basic functions or used as a secondary function, are such that they could still be alternately accessed and interactively used through conventional interfaces not using the customized interfaces of this invention.

DETAILED DESCRIPTION OF THE PREFERRED EMBODIMENT

Figure 1:
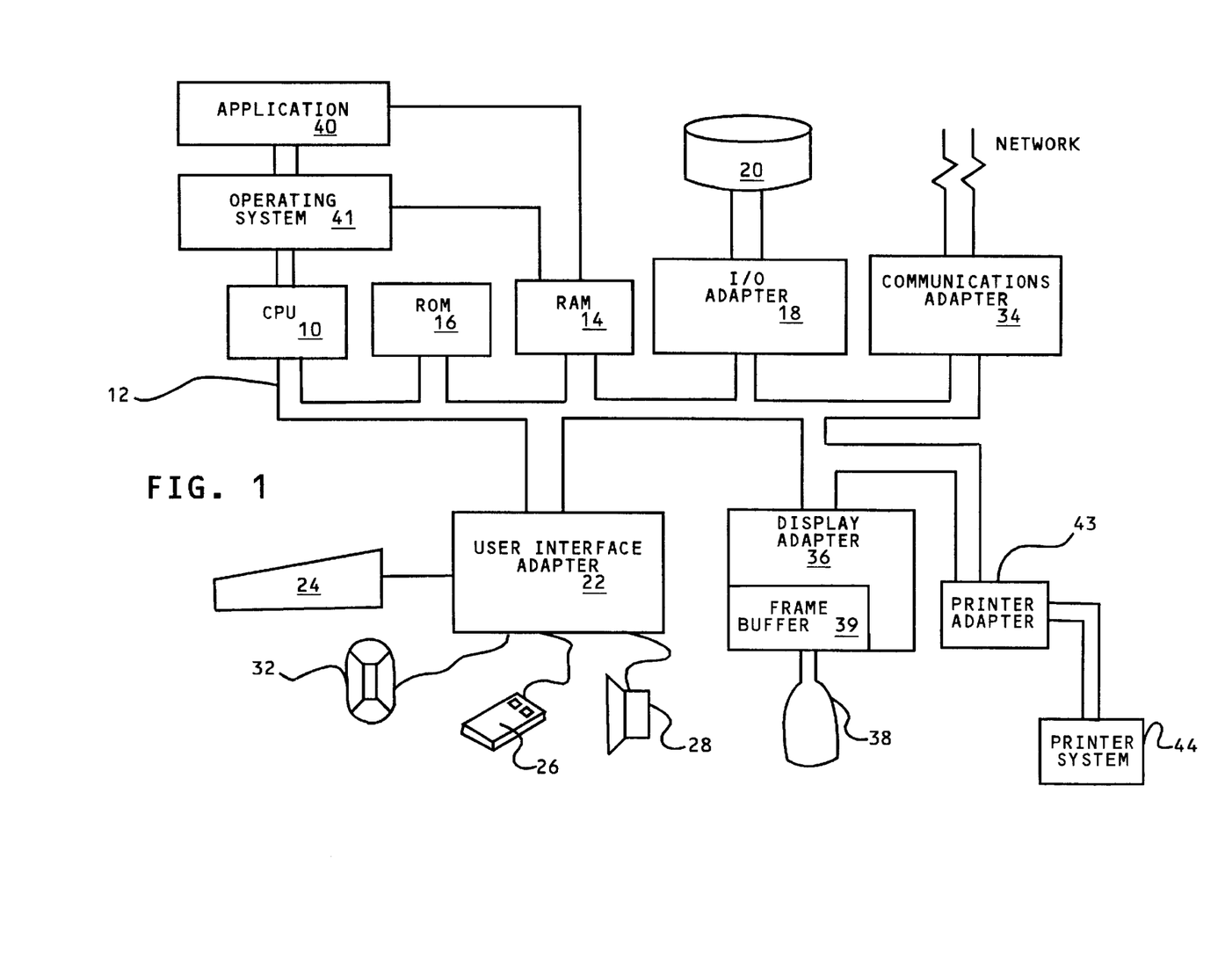
FIG. 1 is a block diagram of an interactive data processor controlled display system including a central processing unit which is capable of implementing the production operations control program of the present invention.

Referring to FIG. 1, a typical data processing system is shown which may function as the computer controlled display terminal used in implementing the production operations control functions in the present invention. A central processing unit (CPU), such as one of the PC microprocessors available from International Business Machines Corporation, is provided and interconnected to various other components by system bus 12. An operating system 41 runs on CPU 10, provides control and is used to coordinate the function of the various components of FIG. 1. Operating system 41 may be one of the commercially available operating systems such as DOS or the OS/2 operating system available from International Business Machines Corporation (OS/2 is a trademark of International Business Machines Corporation); Microsoft's Windows 95™ or Windows NT™; and UNIX and AIX systems. A programming application for monitoring and controlling a production operation, application 40 to be subsequently described in detail, runs in conjunction with operating system 41 and provides output calls to the operating system 41 which implements the various functions to be performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the application 40 are loaded into RAM 14 which is the computer system's main memory. I/O adapter 18 conventionally communicates with the disk storage device 20, i.e. a hard drive. Communications adapter 34 interconnects bus 12 with an outside network enabling the data processing system to communicate with other such systems over a local area network (LAN) to control production operations. I/0 devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, an user is capable of inputting information to the system through the keyboard 24, trackball 32 or mouse 26 and receiving output information from the system via speaker 28 and display 38. In the preferred embodiment, which will be subsequently described, the production operation will be the control of high throughput printers such as electrophotographic or laser printers. A local printer system 44 may be accessed and controlled via printer adapter 43 while, as previously mentioned, networked printers may communicate via communications adapter 34.

There will now be described a simple illustration of the present invention with respect to the display screens of FIGS. 2 through 7. When the screen images are described, it will be understood that these may be rendered by storing an image and text creation programs such as those in any conventional window operating system in the RAM 14 of the system of FIG. 1. The operating system is diagrammatically shown in FIG. 1 as operating system 41. Display screen images are presented to the viewer on display monitor 38 of FIG. 1. In accordance with conventional techniques, the user may control the screen interactively through a conventional I/O device such as mouse 26 of FIG. 1 which operates through user interface 22 to call upon programs in RAM 14 cooperating with the operating system 41 to create the images in frame buffer 39 of display adapter 36 to control the display on monitor 38.

Figure 2:
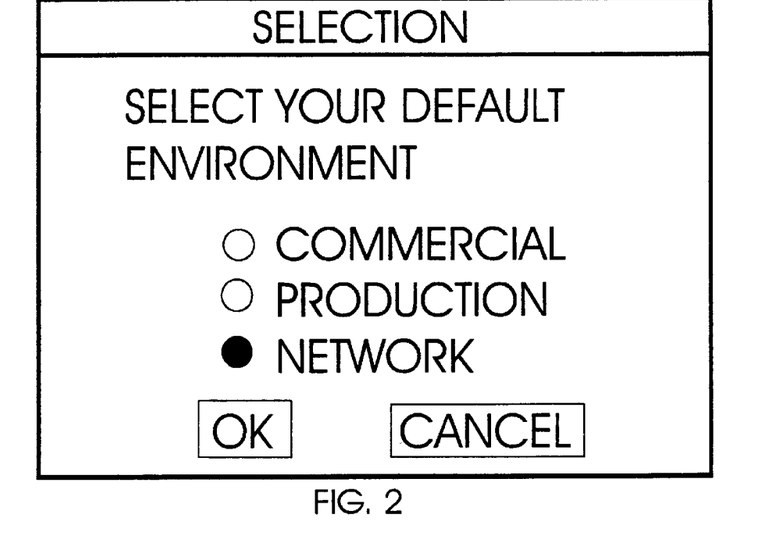
FIG. 2 is a diagrammatic view of a portion of a display screen on which a menu for the interactive selection of one of a plurality of types of printer production operations may be selected and graphically represented.
Figure 3:
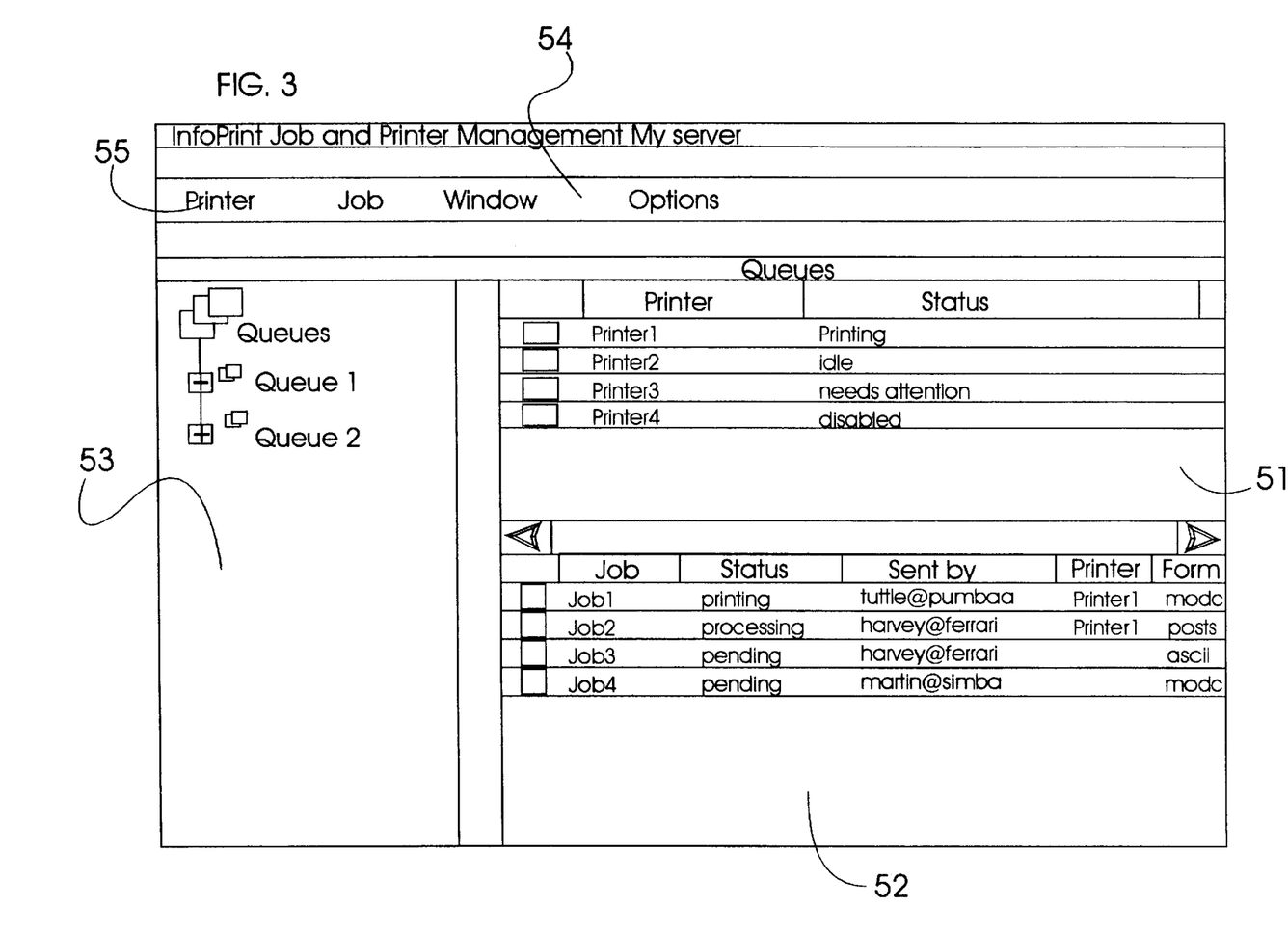
FIG. 3 is a diagrammatic view of a portion of a display screen which may be used in the control of a representative one type of printer production, i.e. network printer production operations as shown selected in the menu of FIG. 2.
Figure 4:
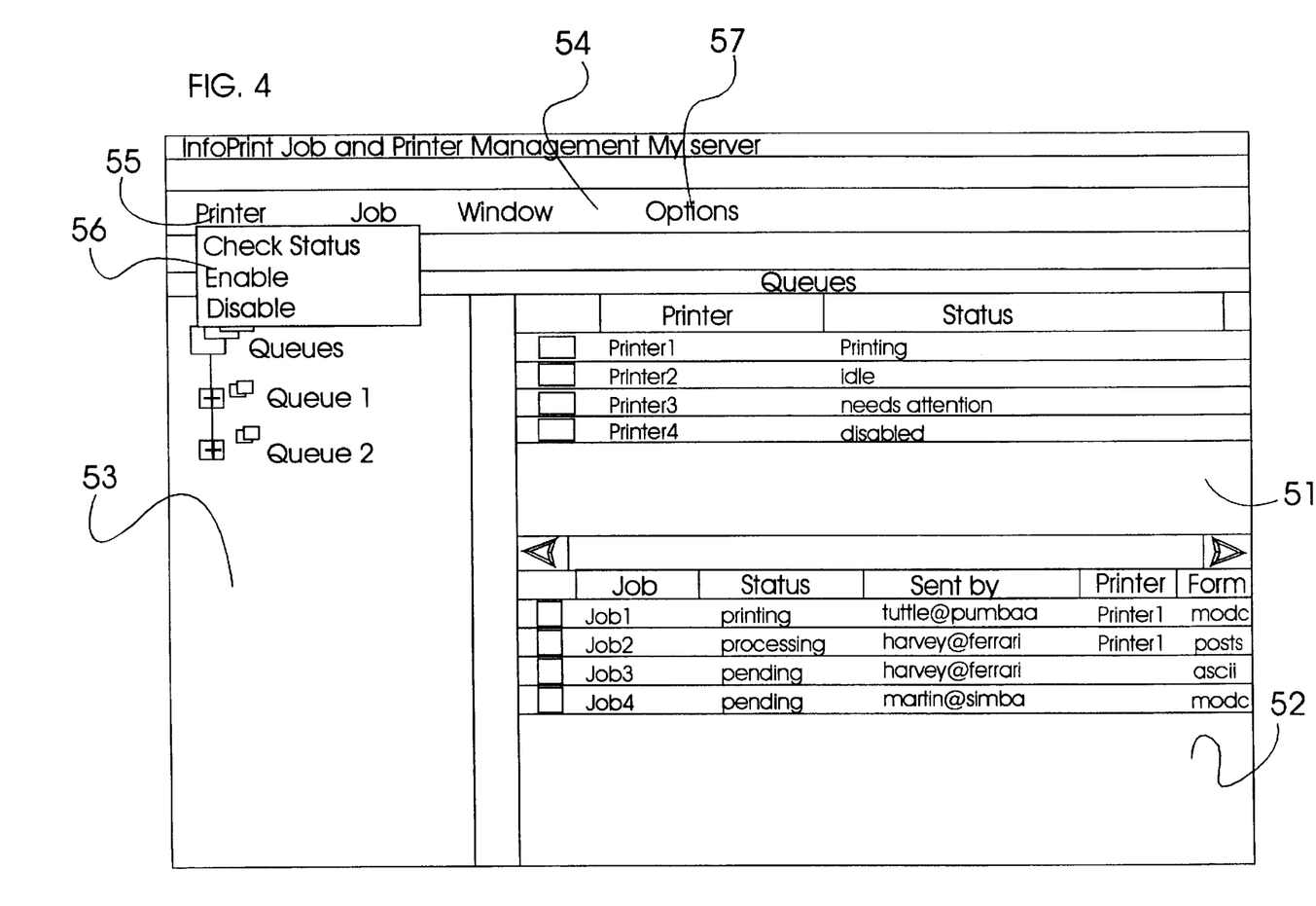
FIG. 4 is the view of the display screen of FIGS. 3 showing the basic set of printer control functions used in network printer production operations.
Figure 5:
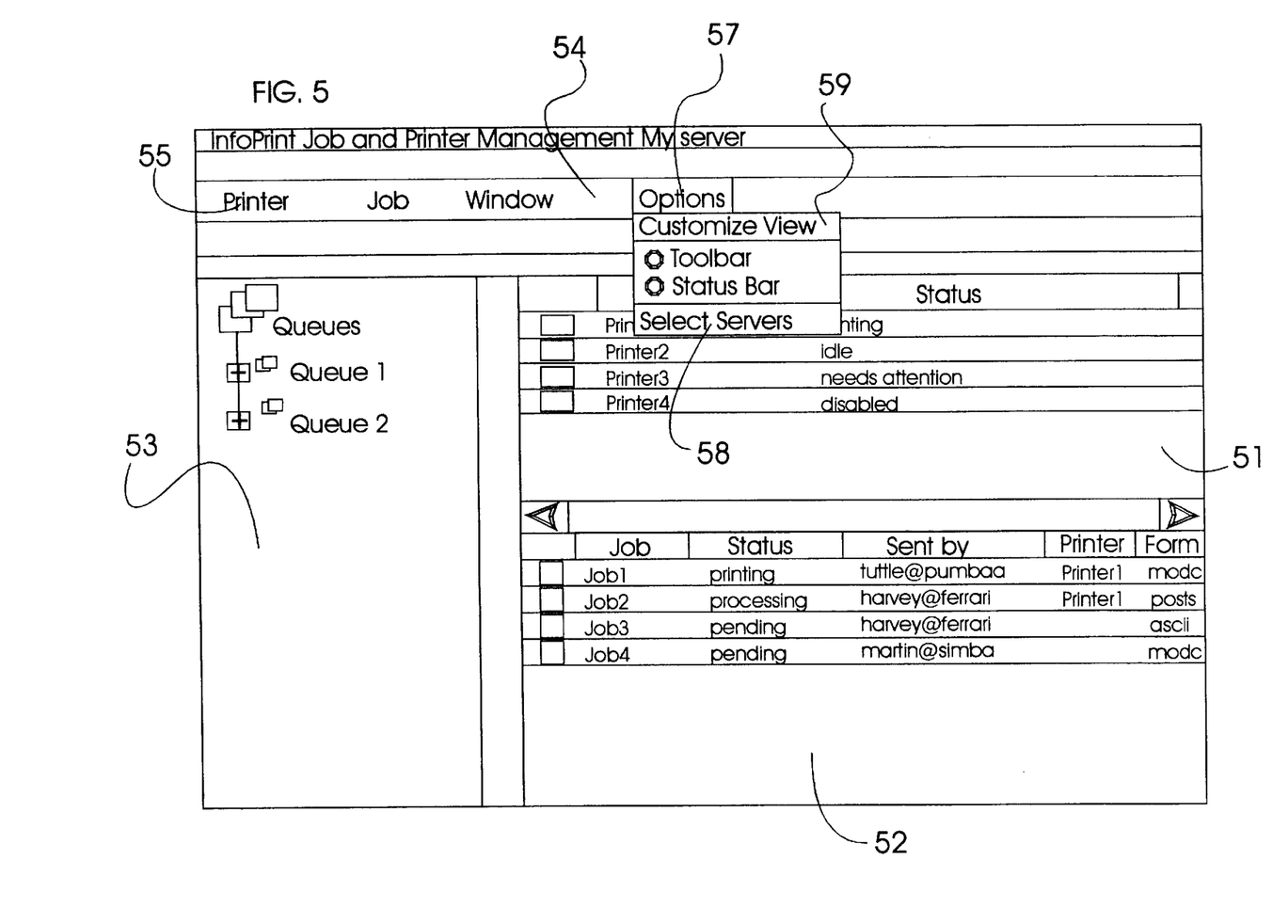
FIG. 5 is the view of the display screen of FIG. 3 showing the menu which is used when the operator needs to customize the basic set of printer control functions.
Figure 6:
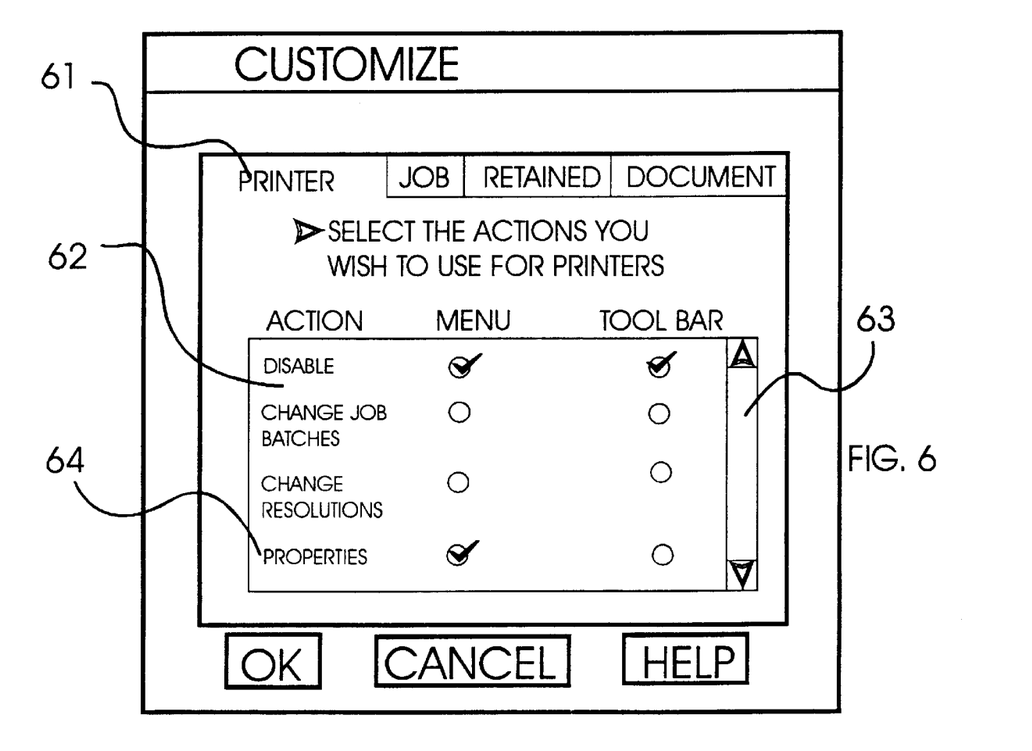
FIG. 6 is a diagrammatic view of a portion of a display screen on which a menu for the interactive customization of a basic set of control functions to add functions is shown.
Figure 7:
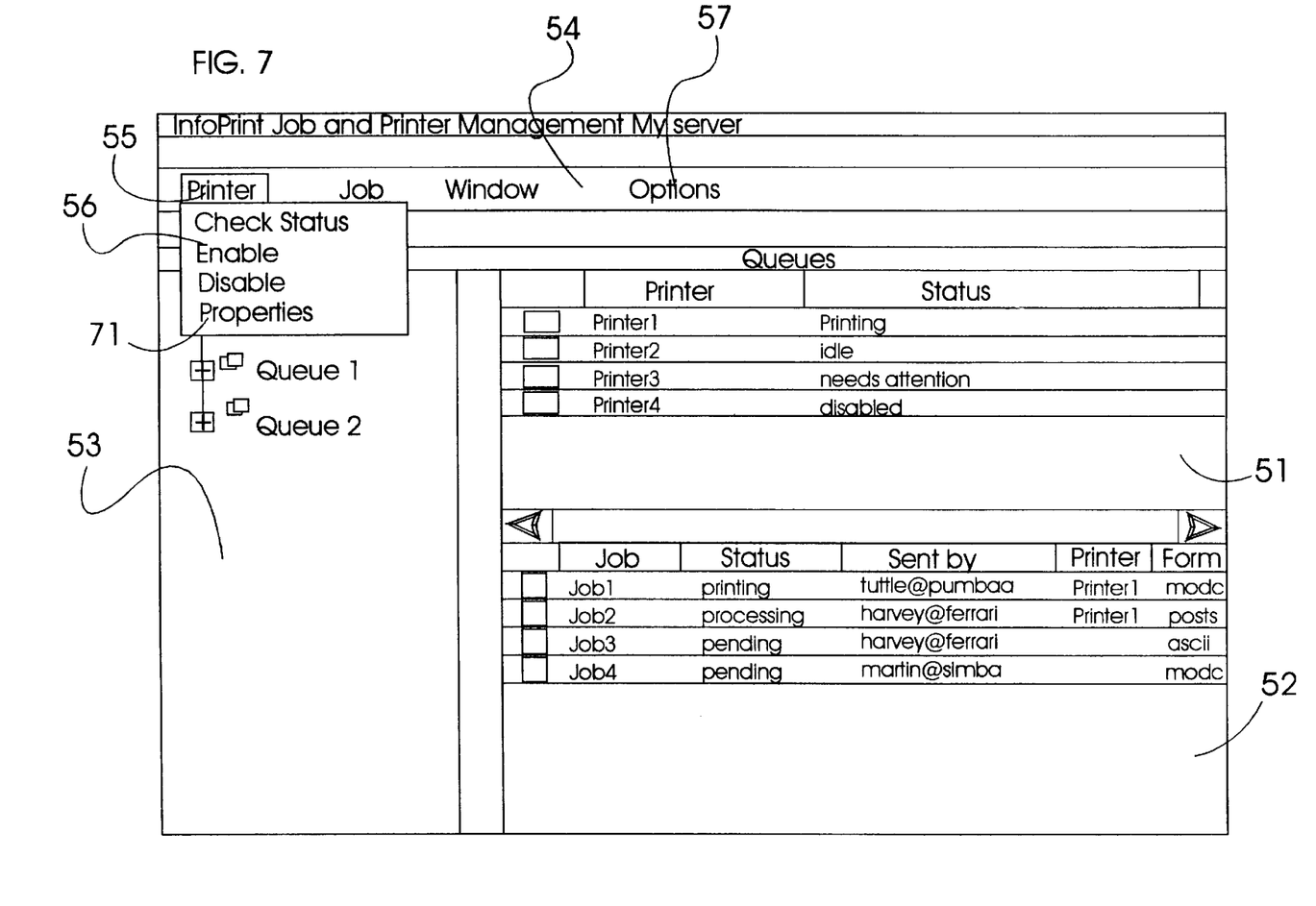
FIG. 7 is the view of the display screen of FIG. 4 showing the basic set of printer control functions customized to include a function added during customization.

The initial display screen of FIG. 2 shows a selection menu through which the operator of high throughput production printing may select one of three sets of printing functions, each set respectively basic to a different type of high throughput printing operation. The type of operation which is referred to as default environment is selected. In high throughput electrophotographic or laser printers such as the IBM InfoPrint InfoColor series of printers, the present invention involves providing a programming system which provides basic sets of functions for the Commercial environment: print shops which print manuals and books on a job by job basis; production printing or data centers which print statements, invoices and bills; and distributed network center environments wherein workers in their offices access printers for a variety of jobs. For purposes of this illustrative embodiment let us assume as shown in FIG. 2 that the printer operator has selected the network environment. This results in the display screen of FIG. 3 which presents the status of the printers, window 51, the status of jobs, window 52, and the individual printer queues, window 53. There is also a menu bar 54 from which the printer control function selection 55 may be chosen. Upon the selection of printer control function 55, a menu of the basic set of control functions 56 for the network operations environment is brought up as shown in FIG. 4. Using this basic set of control functions, the operator is able to control printer functions such as enabling and disabling of printers and jobs, as well as determining their status. This may not be enough and the operator may desire to customize these functions by adding others. He starts this customization by activating the "options" choice 57 on menu bar 54. This brings down menu 58, shown in FIG. 5, which presents "customize view" option 59. This selection of this customize option 59 results in the appearance of a dialog menu for customization shown in FIG. 6 from which the operator chooses to customize the printer control functions 61. By using the window 62, scrollable via bar 63, to view possible additions to the basic set of control functions, he selects "Properties" 64 and this results in the interface screen shown in FIG. 7 in which function of printer properties control 71 is now offered in the customized set 56 of printer 55 control functions.

Figure 8A:
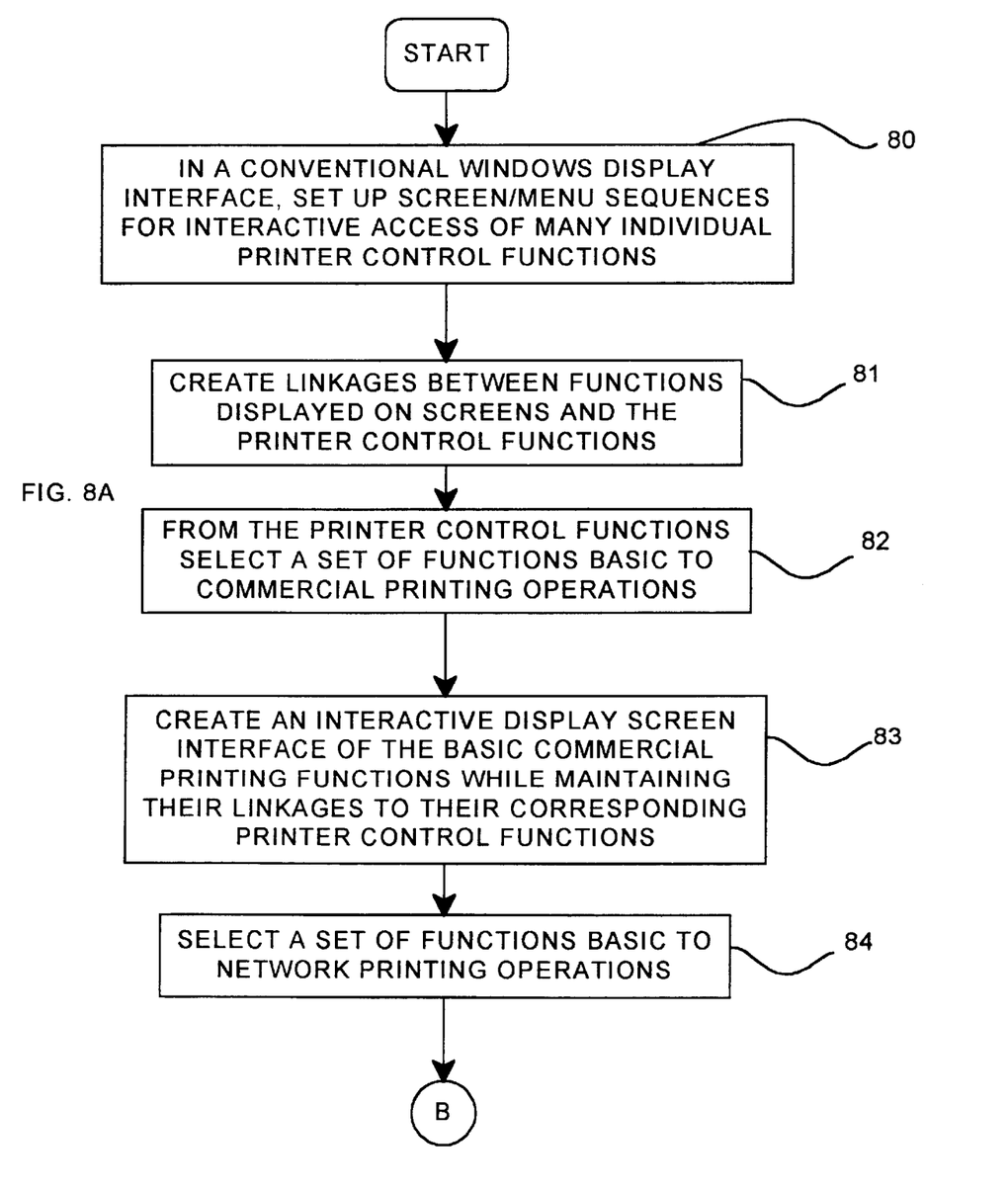
FIGS. 8A through 8C are flowcharts showing the development of a program for interactively presenting selectable sets of basic types of printer control functions and for customizing a basic set of functions according to the present invention.
Figure 8B:
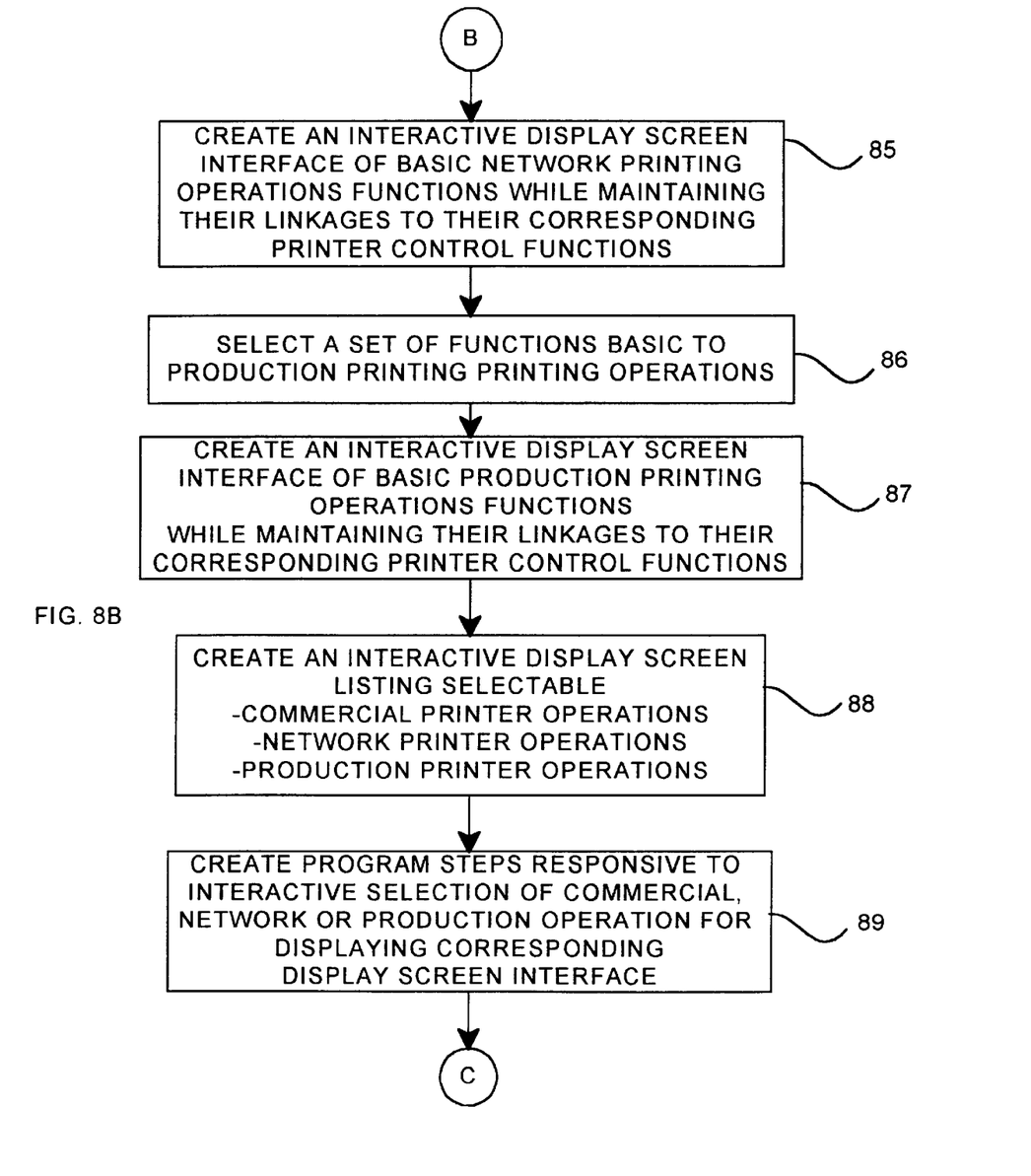
Figure 8C:
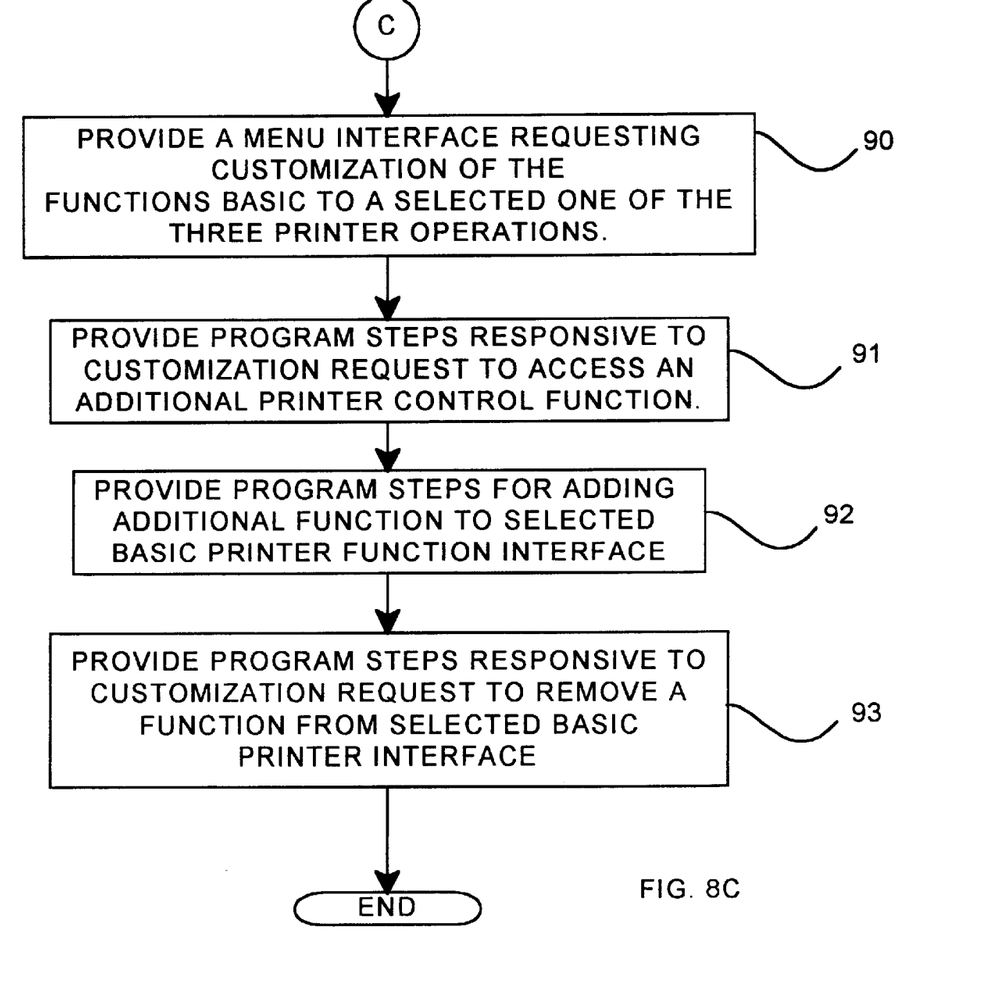

Now with reference to FIGS. 8A through 8C we will describe a process implemented by a program according to the present invention. The flowchart is in three parts (FIGS. 8A, 8B and 8C). The program is continuous and involves the development of the display screen interfaces previously described with respect to FIGS. 2 though 7. In the flowchart of FIG. 8A, a basic window interface is set up, step 80, whereby the operator may control printer functions, e.g. an interface like that of FIG. 3. Of course, appropriate conventional linkages are set up between representations of functions displayed on a screen whether these representations be text or icons representative of the functions and the functions themselves, step 81. Then, step 82, a set of printer control functions basic to a commercial type of printer operation is set up and an appropriate interface to said set of functions is also set up, step 83, while maintaining the linkages between the representations of these basic functions on the display screen and the functions themselves. Next, steps 84 and 85 respectively repeat steps 82 and 83 to set up an interactive set of functions basic to network printing operations, and steps 86 and 87, FIG. 8B, respectively repeat steps 82 and 83 to set up an interactive set of functions basic to the production type of printing operations. An interactive display interface is set up from which the operator may select to operate one of the three basic sets of functions for respectively controlling one of the three basic types of printer operations, step 88. This step will provide the display screen of FIG. 2. Next, step 89, a routine is provided which in response to the selection of one of the basic operations, in the example in FIG. 2, the network type of operation was selected, displays the appropriate interface providing the basic control functions for selected printing operations. Thus in the illustrative example, this results in FIG. 4 network interface control functions 56.

At this point, FIG. 8C provides for customization, step 90; this provides for a customization menu. Assuming in the example that the network basic functions 56, FIG. 4, are to be customized, then step 90 results in the activation of options 57, FIG. 5, the resulting menu 58 from which the customize view option 59 is selected. This results in step 91, FIG. 8C, and a routine for the selection of an additional function which has been previously described with respect to FIG. 6 wherein the properties function 64 was selected to be added to the basic set of network printing functions. Then, step 92, this property function is added to the network printing operations set of functions to provide the customized set of functions shown in FIG. 7 in which the properties control function 71 is added to the basic control functions 56. The program further provides for the removal of a function from a set of control functions, step 93, in a similar manner.

Figure 9:
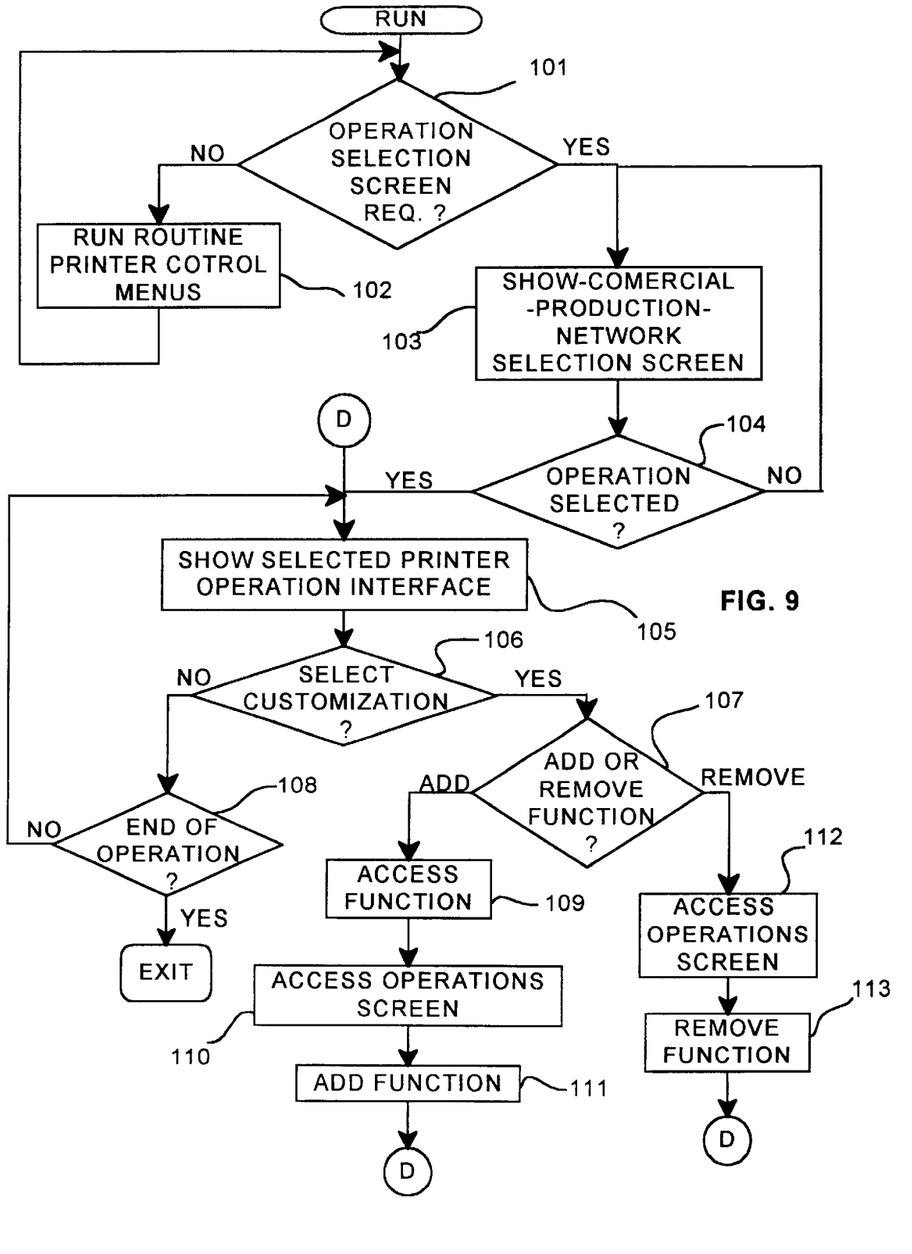
FIG. 9 is a flowchart showing the running of the program described with respect to FIGS. 8A through 8C.

Now that the basic program has been described and illustrated, there will be described with respect to FIG. 9, a flow of a simple operation showing how the program could be run. First, decision step 101, a determination is made as to whether the operator wishes to select one of the sets of functions basic to a type of printer operation. If not, then step 102, the printer could be run routinely with the operator selecting all functions individually until the operator selects to operate under a set of basic control functions. If the decision from step 101 is Yes, then in step 103, the display screen of FIG. 2 is presented to the operator and when in step 104 the operator selects a type of operation, then, step 105, the control interface containing the basic set of functions would be shown to the operator. In the previously described example, this would be the functions in menu 56 of FIG. 4. Then, decision step 106, a determination is made as to whether the operator has selected customization. If he has not, then the interface is continued to be maintained uncustomized until it is determined, in step 108, that the operation is over and thus exited. On the other hand, when customization is selected, the flow moves to step 107 and menu 58, FIG. 5, results in the customization interface of FIG. 6 through which, step 107, FIG. 9, function is to be added or removed. To add, as has been previously described, the function is accessed, step 109, via window 62, FIG. 6, and added, step 111, to provide menu 56 of FIG. 7 which contains the properties function 71 added in the operations screen of step 110. To remove, in a similar way, the printer operations control screen is accessed, step 112, and the function is removed, step 113. After either step 111 or 113, the flow is returned to step 105 via branch D.

While the present invention has been described using printing operations as the illustrative example, the invention is equally applicable to the monitoring and control of a wide variety of industrial, chemical and manufacturing production operations including the manufacturing of integrated circuits, as well as automated tool and die production. In production, in all of these areas, it would be advantageous to provide production control programs which are generic to a particular class of production including a selectable set of basic functions for control of one of a plurality of types of production operations, plus the ability to readily customize by adding additional functions to the selected basic set.

Although certain preferred embodiments have been shown and described, it will be understood that many changes and modifications may be made therein without departing from the scope and intent of the appended claims.

What is claimed is:

1. A data processor controlled display system for the interactive control of a production operation, comprising:

means for providing a plurality of selectable sets of basic interactive functions accessible through a graphical user interface (GUI), each set respectively for the control of one of a plurality of different operating environments for a same type of production operation, wherein each operating environment is associated with one set of basic interactive functions that provide control functions and options to manage said operating environment for the production operation;

means for interactively selecting through the GUI one of said sets of basic interactive functions for the control of one of the operating environments of the production operation;

means for providing a plurality of selectable secondary functions for supplementing said selected set of basic functions controlling said selected operating environment of the production operation;

means for using the GUI to select at least one of said secondary functions; and means for combining said selected at least one secondary function with said selected set of basic functions into a customized interactive display interface for the control of said operating environment of the production operation that is accessible through said GUI.

2. The display system of claim 1 further including means for deleting at least one of said basic functions from said selected set of basic functions in said customized interactive display interface.

3. The display system of claim 1 wherein said production operations are printing operations.

4. The display system of claim 3 wherein said printing operations include a plurality of controlled printers.

5. The display system of claim 1 wherein said secondary functions are selected from an unselected one of said sets of basic functions.

6. The display system of claim 1 wherein there is a separate selectable view for a commercial print environment, a production print environment, and a network print environment.

7. The display system of claim 1, wherein each set of basic interactive functions comprises a different view of the GUI.

8. The display system of claim 7 wherein at least two of the plurality of views represent a different skill level of the intended user.

9. In a data processor controlled display system, a method for the interactive control of a production operation, comprising:

providing a plurality of selectable sets of basic interactive functions accessible through a graphical user interface (GUI), each set respectively for the control of one of a plurality of operating environments for a same type of production operation, wherein each operating environment is associated with one set of basic interactive functions that provide control functions and options to manage said operating environment for the production operation;

interactively selecting through the GUI one of said sets of basic interactive functions for the control of one of the operating environments of the production operation;

providing a plurality of selectable secondary functions for supplementing said selected set of basic functions controlling said selected operating environment of the production operation, using the GUI to select at least one of said secondary functions; and combining said selected at least one secondary function with said selected set of basic functions into a customized interactive display interface for the control of said selected operating environment of the production operation that is accessible through said GUI.

10. The method of claim 9 further including the step of deleting at least one of said basic functions from said selected set of basic functions in said customized interactive display interface.

11. The method of claim 9 wherein said production operations are printing operations.

12. The method of claim 11 wherein said printing operations include a plurality of controlled printers.

13. The method of claim 10 wherein said secondary function are selected from an unselected one of said sets of basic functions.

14. The method of claim 9, wherein each set of basic interactive functions comprises a different view of the GUI.

15. The method of claim 14 wherein at least two of the plurality of views represent a different skill level of the intended user.

16. A computer controlled display program having program code included on a computer readable medium for the interactive control of a production operation, wherein the code is capable of causing a computer to perform:

providing a plurality of selectable sets of basic interactive functions accessible through a graphical user interface (GUI), each set respectively for the control of one of a plurality of operating environments for a same type of production operation, wherein each operating environment is associated with one set of basic interactive functions that provide control functions and options to manage said operating environment for the production operation;

interactively selecting through the GUI one of said sets of basic interactive functions for the control of one of the operating environments of the production operation;

providing a plurality of selectable secondary functions for supplementing said the selected set of basic functions controlling said selected operating environment of the production operation, using the GUI to select at least one of said secondary functions; and combining said selected at least one secondary function with said selected set of basic functions into a customized interactive display interface for the control of said selected operating environment of the production operation that is accessible through said GUI.

17. The computer controlled display program of claim 16 further including means for deleting at least one of said basic functions from said selected set of basic functions in said customized interactive display interface.

18. The computer controlled display program of claim 16 wherein said production operations are printing operations.

19. The computer controlled display program of claim 18 wherein said printing operations include a plurality of controlled printers.

20. The computer controlled display program of claim 16 wherein said secondary functions are selected from an unselected one of said sets of basic functions.

21. The computer controlled display program of claim 16, wherein each set of basic interactive functions comprises a different view of the GUI.

22. The computer controlled display program of claim 21, wherein at least two of the plurality of views represent a different skill level of the intended user.

* * * * *